United States Patent [19]

Connell et al.

[11] Patent Number: 4,566,393
[45] Date of Patent: Jan. 28, 1986

[54] WOOD-WASTE BURNER SYSTEM

[76] Inventors: Ralph M. Connell, 2401 Bayou Blvd., Pensacola, Fla. 32503; Edward O. Dawson, R.R. 4, Box 187, Brewton, Ala. 36426

[21] Appl. No.: 580,329

[22] Filed: Feb. 15, 1984

[51] Int. Cl.[4] ............................ F23C 1/10; F22B 5/00
[52] U.S. Cl. ........................... 110/261; 110/262; 110/263; 110/265; 110/101 CA; 122/22; 122/15
[58] Field of Search ............... 110/347, 260–265, 110/101 CA; 122/22, 235 H, 235 HH, 15

[56] References Cited

U.S. PATENT DOCUMENTS

| | | |
|---|---|---|
| 307,552 | 11/1884 | Jenkins . |
| 901,232 | 10/1908 | Elderd ................... 110/263 |
| 1,354,741 | 10/1920 | Harder ................... 110/263 |
| 2,046,767 | 7/1936 | Campbell ................... 110/261 |
| 2,295,045 | 9/1942 | Mettler ................... 110/101 CA |
| 2,971,480 | 2/1961 | Sage ................... 110/265 |
| 3,396,681 | 8/1968 | Hubbard . |
| 3,822,984 | 7/1974 | Straitz, III ................... 431/283 |
| 3,831,535 | 8/1974 | Baardson . |
| 3,837,303 | 9/1974 | Baardson ................... 431/175 |
| 3,894,834 | 7/1975 | Estes ................... 110/261 |
| 3,971,345 | 7/1976 | Csathy . |
| 4,032,287 | 6/1977 | Blum et al. ................... 110/262 |
| 4,096,808 | 6/1978 | Trickel . |
| 4,132,180 | 1/1979 | Frederick . |
| 4,167,389 | 9/1979 | Donnelly et al. ................... 431/79 |
| 4,170,964 | 10/1979 | Jehn et al. . |
| 4,249,471 | 2/1981 | Gunnerman ................... 110/243 |
| 4,254,715 | 3/1981 | LaHaye et al. . |
| 4,289,079 | 9/1981 | Swistun . |
| 4,312,278 | 1/1982 | Smith et al. . |
| 4,318,355 | 3/1982 | Nelson ................... 110/261 |
| 4,337,030 | 6/1982 | Gootzait et al. . |
| 4,351,251 | 9/1982 | Brashears . |
| 4,412,810 | 11/1983 | Izuha et al. ................... 110/261 |

Primary Examiner—Henry C. Yuen
Attorney, Agent, or Firm—Beveridge, DeGrandi & Weilacher

[57] ABSTRACT

Wood-waste products, such as wood shavings, wood chips and sawdust, are burned in an apparatus having a waste burner comprising an elongated cylinder in which fuel and air are mixed and ignited before entering an enlarged combustion chamber. The waste burner is characterized by an elongated cylinder having a length substantially larger than its diameter so that the fuel can be heated to a temperature sufficient to pyrolyze volatiles and initiate combustion in the cylinder. A wood-waste burner apparatus is also provided and comprises the waste burner of the invention and a combustion chamber for receiving unburned fuel and combustion products emanating from the burner. A process for burning wood-waste products is also provided. The invention is especially well suited for retrofitting packaged boilers to accommodate wood-waste fuels.

7 Claims, 6 Drawing Figures

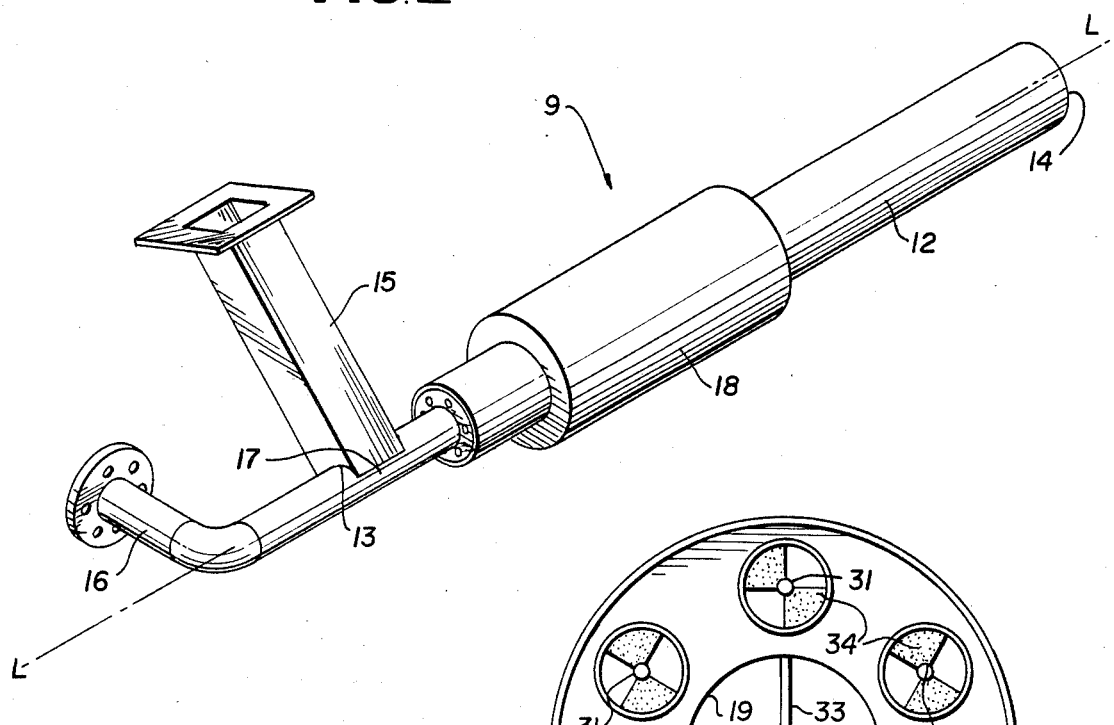
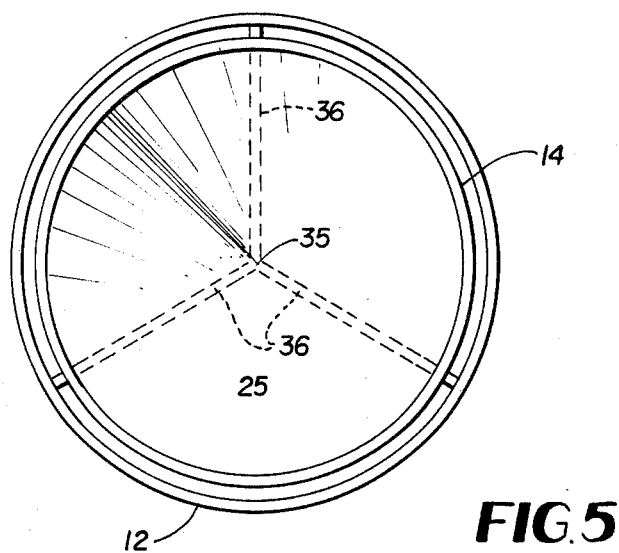
FIG.2
FIG.4
FIG.5

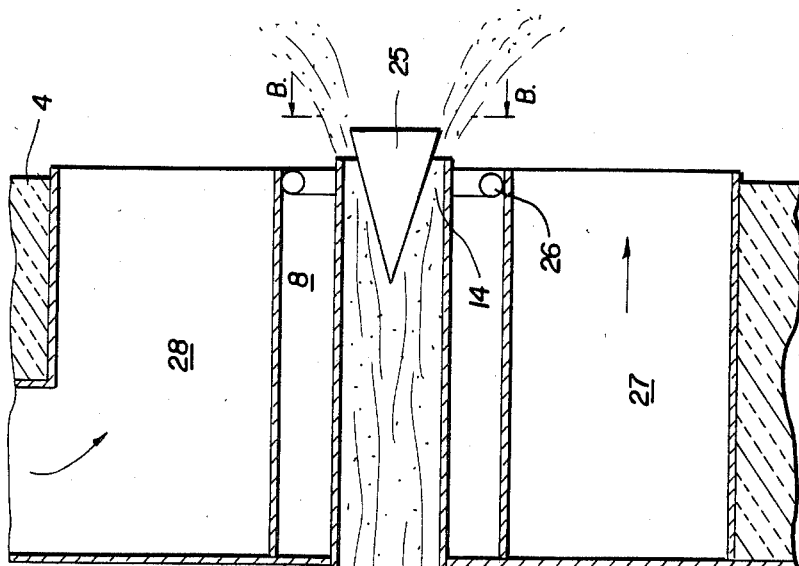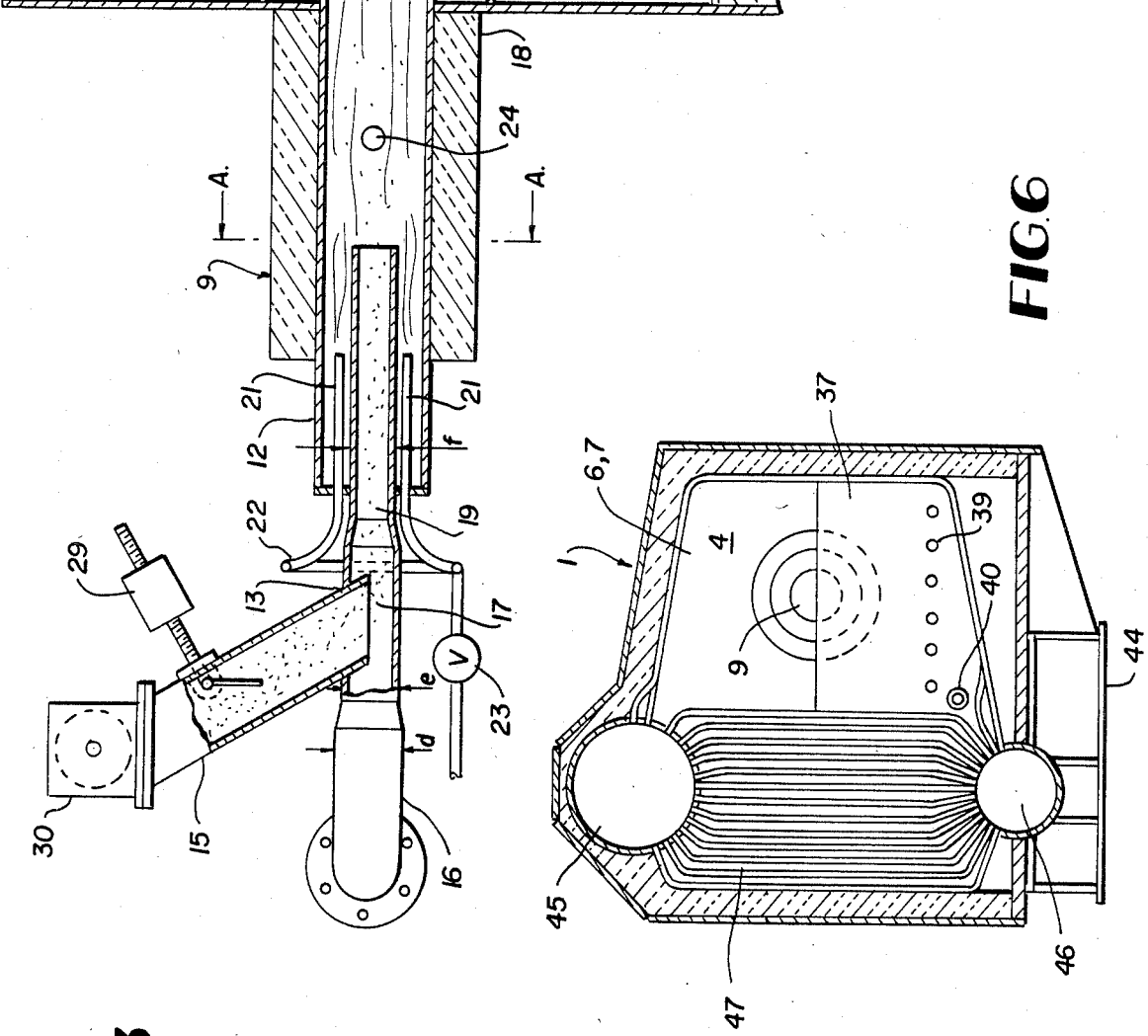

WOOD-WASTE BURNER SYSTEM

BACKGROUND OF THE INVENTION

This invention relates to a burner system for burning wood-waste products, such as wood shavings, sawdust and wood chips.

Wood is one of the most important natural resources and one of the few that is renewable. Timber demand for all forest products is projected to rise faster than supplies from U.S. forests. It is increasingly important to utilize the wood harvest efficiently, use currently underutilized wood species and employ the considerable quantities of unused residues.

While wood and wood by-products are known for use as fuels, for a variety of reasons, natural gas, coal and oil have been preferred. Curtailment of supplies of these latter fuels, however, has created renewed interest in the use of wood and wood by-products as fuels for residential, commercial and industrial heating purposes. In addition, increasing concern about the damage caused by acid rain, which is believed to be based on the burning of high-sulphur coal and oil, makes wood and wood by-products even more attractive for use as fuels because wood is substantially free of sulphur.

Wood-waste combustion systems are known in the art, and they include pile burning and modified pile burning systems, such as Dutch ovens. Most of the wood and wood-waste products that are burned today are heterogenenous materials necessitating the use of a spreader-stoker or a pile-burning system. The modern spreader-stoker dominates; it is a water wall furnace with traveling grates, regenerative air heaters and extensive pollution control devices. The extensive fuel handling system required for wood-fired systems adds appreciably to the total cost of a combustion system.

Large amounts of fossil fuels are combusted in commercially available boilers, which are frequently referred to as "package boilers" because they are available in substantially ready-assembled form for installation at a plant site or other facility. Because package boilers have been in use for many years, numerous such devices are located throughout the country. However, most of the package boilers were designed to burn natural gas or fuel oil rather than a solid fuel, such as wood-waste.

In order to take advantage of the abundant supply of wood-waste materials as fuel in some parts of the country while avoiding the heavy capital investment required for a new solid fuel boiler, there exists a need for a wood-waste burner system that can be adapted to package boilers that were originally designed for burning natural gas or fuel oil. The wood-waste burner system should be of low cost relative to a new solid fuel boiler, it should be relatively easy to install in existing boiler facilities, require low maintenance, be simple to operate and above all provide efficient burning of the wood-waste products.

SUMMARY OF THE INVENTION

Accordingly, this invention aids in fulfilling these needs in the art by providing a waste burner for burning a fuel comprising combustible, solid, divided wood-waste. The burner comprises an elongated cylinder having a longitudinal axis, a fuel inlet proximate one end of the cylinder and an outlet at the other end. Means are provided for supplying air to the burner for combusting the fuel. The air supply means is positioned upstream of the fuel inlet such that the air intimately mixes with the fuel in a mixing zone to form a fuel/air mixture. Means for igniting the fuel/air mixture in the cylinder is also provided. The ignition means comprises a multiplicity of pilot flame nozzles substantially uniformly spaced around the circumference of the cylinder. A diffuser means is positioned in the outlet of the cylinder for directing unburned fuel and combustion products away from the axis of the cylinder as the unburned fuel and combustion products exit from the cylinder. The cylinder has a length:diameter ratio sufficient to partially combust the fuel in the cylinder.

This invention also provides an apparatus for burning combustible, solid, divided wood-waste products comprising a burner of the invention and a refractory lined chamber defined by side walls. The outlet of the burner passes through one of the side walls such that unburned fuel and combustion products from the burner pass into the chamber where combustion is carried to substantial completion.

Further, this invention provides a process for burning a fuel comprising combustible, solid, divided wood-waste products. The process comprises feeding the fuel to a waste burner of the invention, feeding air to the burner and intimately mixing the fuel and air to form the fuel-air mixture. The mixture is heated to a temperature sufficient to pyrolyze volatiles in the fuel and to initiate combustion in the mixture. The resulting burning mixture is discharged into a combustion chamber where the combustion reaction is carried to substantial completion.

BRIEF DESCRIPTION OF THE DRAWINGS

This invention will be more fully understood by reference to the drawings in which:

FIG. 2 is a pictorial representation of the burner of this invention;

FIG. 3 is a cross-sectional view of the burner of FIG. 2 showing the internal details of the burner;

FIG. 4 is a view through section A—A of FIG. 3 showing the pilot assembly in the burner of this invention;

FIG. 5 is a view through section B—B of FIG. 3 showing the conical diffuser employed in the burner of this invention; and FIG. 6 depicts a conventional water tube steam generator in combination with the wood-waste burner apparatus of this invention.

DETAILED DESCRIPTION

Figure 1:
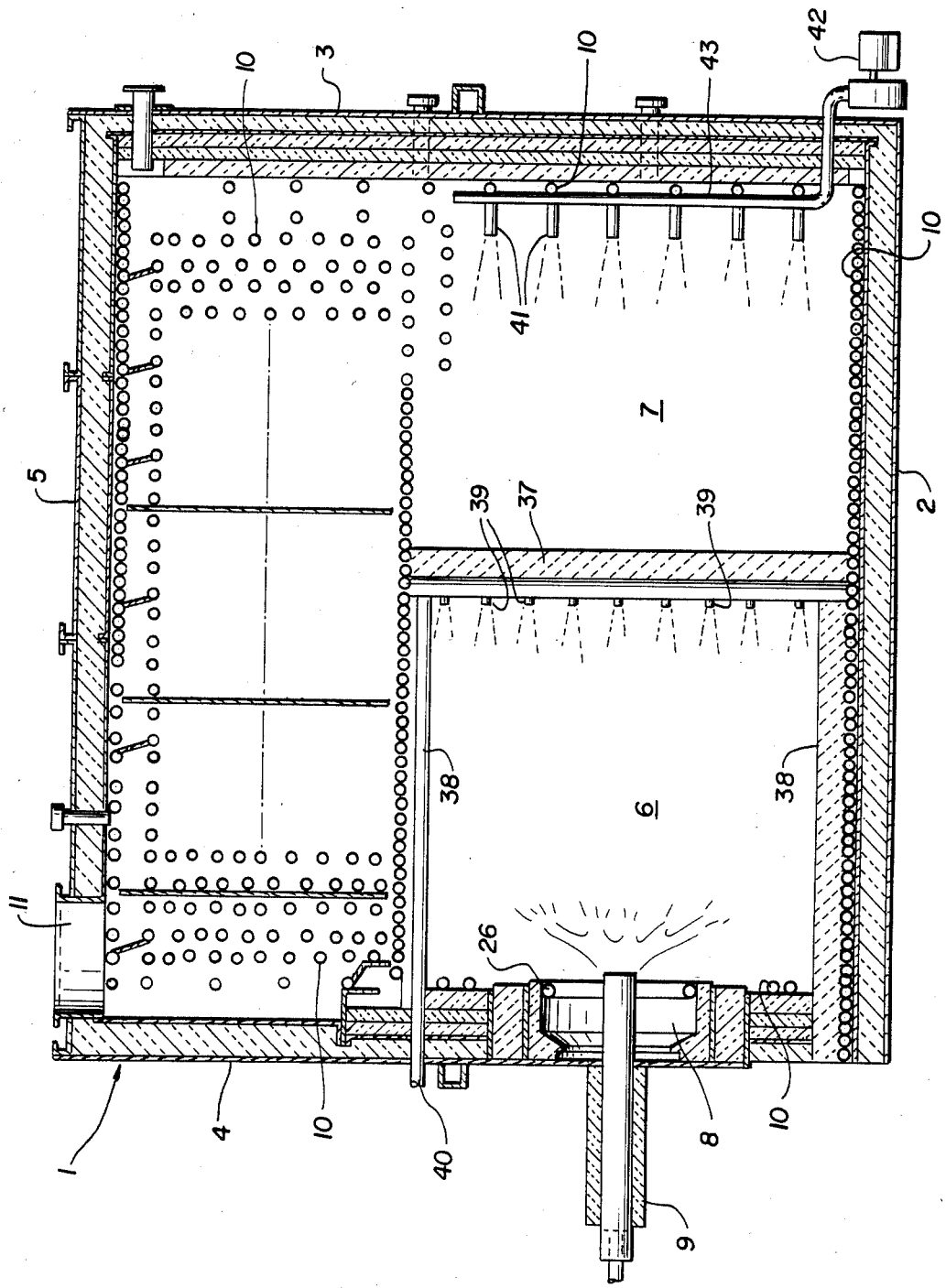
FIG. 1 is an illustration of a wood-waste burner apparatus according to this invention.

Referring to FIG. 1, a conventional boiler for generating steam for industrial heating and process use is generally designated as 1. The boiler is defined by a floor 2, side walls 3 and 4 and a top 5. While the details of construction of these members is not shown in FIG. 1, it will be understood that they typically comprise inner and outer seal casings separated by insulating block. The internal surfaces of the boiler may be faced with a high temperature-resistant tile or other suitable thermally resistant material. The boiler includes a combustion chamber 6-7 having an opening 8 in side wall 4 through which a fuel burner 9 is passed. Inside the boiler are a number of water tubes 10, which are depicted in FIG. 1 as crosses enclosed in circles or merely crosses. The floor 2 of the boiler and walls 3 and 4 are also provided with water tubes 10.

During operation of the boiler 1, fuel from burner 9 is injected into the combustion chamber 6-7 where it is burned. The resulting hot gases and other combustion products pass over water tubes 10 thereby converting the water in the tubes to steam. The gases and combustion products exit the boiler through a flue gas outlet 11. The water pipes on the floor 2 and on walls 3 and 4 aid in cooling these surfaces while simultaneously serving to achieve the conversion of water in the pipes to additional steam.

Referring to FIG. 2, a pictorial representation of the burner 9 of this invention appears. The burner comprises an elongated cylinder 12 having a longitudinal axis L—L and a fuel inlet 13 proximate one end of the cylinder 12. An outlet 14 is provided at the other end of the cylinder. A combustible, solid, divided wood-waste, such as wood shavings, sawdust or wood chips, is fed to the fuel inlet through a chute 15. A pipe 16 supplies air from an air blower (not shown) to the burner 9 for combusting the fuel. The air supply means 16 is positioned upstream of the fuel inlet 13 such that the air intimately mixes with the fuel in a mixing zone generally designated as 17 in FIG. 2. At least a portion of the external surface of elongated cylinder 12 can be provided with a suitable insulating material 18 to conserve heat energy and to ensure safe operation in the work area.

FIG. 3 is a cross-sectional view of the burner 9 shown in FIG. 2. Fuel entering the burner 9 through the feed chute 15 and air entering the burner from air supply 16 are mixed together in a turbulent mixing zone 17 to form a fuel-air mixture. In order to minimize resistance to air flow in air supply 16 yet provide sufficient turbulence in the mixing zone 17, the diameter "d" of pipe 16 is reduced to diameter "e" just prior to mixing zone 17. This reduction in diameter increases the velocity of the air flowing through the pipe 16 thereby increasing turbulence in the mixing zone 17 to ensure that the wood-waste fuel particles, which may have agglomerated, and are reduced to a divided state in the combustion air. In order to ensure further mixing of the air and fuel particles, the conduit 19 carrying the fuel-air mixture into the cylinder 12 can be further reduced in cross-sectional area by providing the conduit 19 with a diameter "f" which is smaller than the diameter "e". In this way, mixing of the fuel with the combustion air to form a substantially homogeneous mixture can be carried out continuously between the fuel inlet 13 and a fuel ignition zone, generally designated as 20 in FIG. 3.

A multiplicity of gas-fired, pilot flame nozzles 21 are spaced around the internal circumference of cylinder 12. The pilot flame nozzles initiate the combustion process for the fuel/air mixture in the cylinder. The pilot flame nozzles 21 are fed with natural gas through a gas supply manifold 22 equipped with a control valve 23 to aid in regulating flame conditions in the pilot flame nozzles 21.

The fuel/air mixture from conduit 19 enters the elongated cylinder 12 of enlarged diameter. The fuel/air mixture contacts the pilot flames and the combustion process is initiated. The enlarged diameter of cylinder 12 relative to the diameter of conduit 19 causes the velocity of the fuel/air mixture to be reduced thereby increasing the residence time of the mixture in the cylinder to ensure that volatiles in the fuel are pyrolyzed and that combustion of the mixture is initiated. In order to ensure that a flame develops in the fuel/air mixture, means are provided for detecting flame in the mixture. An opening 24 for a conventional flame scanner (not shown) can be provided for this purpose.

The fuel-air mixture is at least partially combusted in the cylinder 12 before it passes through the cylinder outlet 14 into the combustion chamber 6-7 of boiler 1. A diffuser 25 is positioned in the outlet 14 of the cylinder 12 for directing unburned fuel and combustion products exiting from the cylinder away from the longitudinal axis of the cylinder. The diffuser 25 is of conical cross-section and is positioned such that the longitudinal axis of the cone coincides with the longitudinal axis of the cylinder and the apex of the cone is inside the cylinder. The diffuser aids in distributing the hot combustion products and unburned fuel from outlet 14 into the combustion chamber 6-7 of boiler 1 to aid in the combustion process.

Opening 8 in the boiler wall 4 is the opening typically provided for a gas or oil-fired burner. While the original burner can be removed and the burner 9 of this invention passed through the side wall 4 to form the wood-waste product burning apparatus of this invention, depending upon the configuration of the original burner installation, it is possible to leave the original gas burner ring 26 in position in the boiler wall 4. As also shown in FIG. 3, the insulation 18 can be provided over the entire external surface of the cylinder covering the combustion zone for purposes of safety and economy.

The conventional boiler 1 is usually provided with air registers 27 and 28 for forcing air from a fan into the combustion chamber 6-7 of the boiler. Supplying air to the combustion chamber through these registers ensures complete combustion of the wood-waste fuel in the combustion chamber.

It will be apparent from FIG. 3 that the cylinder 12 has a length that is substantially greater than the internal diameter of the cylinder. As used herein, the "length" of the cylinder is intended to mean the distance between the outlet 14 of the cylinder and the openings in the pilot flame nozzles 21 from which the pilot flames spread. It will also be apparent from the preferred embodiment shown in FIG. 3 that the primary direction of flame spread from the pilot flame nozzles is in the same direction as the direction of flow of the fuel/air mixture in the cylinder.

Still other embodiments of this invention are shown in FIG. 3. For reasons of safety, it is desirable to prevent the spread of flame through conduit 19, mixing zone 17 and feed chute 15 to the fuel storage and supply area of the boiler facility. A temperature activated damper for closing conduit 15 can be provided to prevent flame spread through the conduit. A conventional safety flashback damper 29 can be utilized for this purpose.

In addition, means can be provided for conveying the fuel to chute 15. A device found suitable for this purpose is a screw-driven conveyor provided with a variable speed drive to control the feed rate of fuel to the chute 15. A cross-sectional view of a wood screw 30 is generally shown in FIG. 3.

FIG. 4 is a view through section A—A in FIG. 3 showing the preferred pilot assembly in the burner 9 of this invention. The assembly comprises six pilot flame nozzles 31 substantially uniformly spaced around the circumference of cylinder 12. The nozzles 31 are held in spaced relation by securing each one to a nozzle-holding plate 32. Supports 33 are provided to strengthen the assembly. The pilot nozzles are generally fired with a liquid or gaseous fuel, such as natural gas or fuel oil. The pilot nozzles 31 must also be supplied with air for combusting the pilot fuel. This can be accomplished by including an air duct 34 concentric with each nozzle 31. Each air duct 34 can be provided with an air register (shown shaded in FIG. 4) to regulate the amount of air to the pilot nozzle. The fuel-air mixture passing through the conduit 19 expands in volume as it enters the enlarged diameter of cylinder 12 thereby contacting the pilot flames.

FIG. 5 is a view through section B—B of FIG. 3 showing the preferred diffuser of conical cross-section employed in the burner of this invention. The cone 25 shown in FIG. 5 is inserted in the outlet 14 of cylinder 12 to restrict the outlet opening. As unburned fuel and combustion products exit the cylinder 12, they are directed away from the longitudinal axis (shown as a point 35) of the cylinder. This aids in diffusing and distributing the unburned fuel and combustion products in combustion chamber 6–7 to ensure substantially complete combustion and utilization of the heating value of the fuel. Cone supports 36 are provided to secure the cone in position in the outlet 14.

Modifications to the conventional package boiler 1 will be described by again referring to FIG. 1. It has been found to be advantageous to divide the combustion chamber 6–7 into two fire boxes, one fire box being designated 6, the other fire box being designated 7. This is accomplished by installing a bridge wall 37 of a suitable high temperature-resistant material. This results in the formation of a "mini-Dutch oven" 6 in which unburned fuel from burner 9 is further combusted. To further aid in combustion, the water tubes 10 along the floor 2 of fire box 6 and the corresponding water tubes running along the ceiling of fire box 6 are covered with a refractory material. This can be conveniently accomplished by installing the refractory material over the tubes 10 with mechanical friction clips. Similarly, the bridge wall 37 can be provided with refractory material 38. The refractory material is gradually raised to a very high temperature by the hot combustion products emitted from the burner. The refractory material retains the heat and radiates it back onto unburned fuel emitting from the burner to aid in combustion of the fuel. In order to further aid in combustion of the fuel in fire box 6, the bridge wall 37 is provided with a multiplicity of air openings, such as air nozzles or jets 39, to provide a flow of secondary air in an amount such that the total air supplied to the fuel in burner 9 and fire box 6 exceeds the stoichiometric amount required for complete combustion of the fuel. The nozzles 39 can be fed by a bridge wall air blower conduit generally designated as 40 in FIG. 1.

Unburned fuel in fire box 6 passes into fire box 7 where further combustion occurs. Fire box 7 can also be provided with secondary air openings 41 fed by an air blower 42 to provide excess air for complete combustion. The air openings 41 can be fed by the blower 42 through a manifold 43. It is preferred that the secondary air fed to fire box 6 and fire box 7 be preheated.

The hot combustion gases and other products of combustion exit the fire box 6 and fire box 7 in the conventional way and pass over water tubes 10 to generate steam before exiting flue gas outlet 11. Particulate materials, such as char and unburned fuel, can be recovered from the flue gas in a cyclone separator and recycled to the burner inlet if desired.

What has been described is a three-stage combustion process for efficiently recovering the heating value of a fuel consisting of combustible, solid, divided wood-waste, such as wood shavings, wood chips and sawdust. The first stage of the process takes place in the burner 9 where the wood-waste fuel is intimately mixed with air to form a fluidized fuel/air mixture, which is ignited and at least partially burned. The second stage of combustion is carried out in fire box 6, preferably by the addition of secondary air through air openings 39. The third stage of combustion, which ensures complete combustion of the fuel, takes place in fire box 7, once again with the aid of secondary air fed to the fire box through air openings 41. It will be apparent from the foregoing description and the accompanying Figures that the burner of this invention can be readily retrofitted to an existing package boiler. It will also be apparent that the package boiler can be modified to efficiently combust the wood-waste fuel by making very simple structural changes and other modifications to the original combustion chamber.

In a preferred embodiment of this invention, a conventional positive draft boiler is converted to a negative draft boiler by providing an induction fan in the flue gas outlet. It has been found that this embodiment results in more efficient fuel combustion and heat recovery and reduces casing over-heating problems associated with oil- and gas-fired positive pressure boilers.

The burner of this invention is particularly well suited for retrofitting water tube steam generators of the D-type. The D-type boiler can be readily modified as described above to accommodate the burner of this invention and to efficiently combust waste-wood products. A D-type boiler modified in accordance with this invention is shown in FIG. 6. The boiler 1 is supported on a structural frame 44. The boiler contains a steam drum 45, a water drum 46 and convection tubes 47 through which water and steam flow. The burner 9 of this invention is provided in side wall 4 and bridge wall 37 is erected in the combustion chamber 6–7 to form two separate fire boxes (6 and 7 shown in FIG. 1). Air supply 40 furnishes air to bridge wall air jets 39. It is apparent from the Figure that the hot gases and other combustion products contact the exterior surfaces of convection tubes 47 to provide heat transfer to water contained in the tubes to generate steam. It will also be apparent from FIG. 6 that the boiler modifications required for the D-type boiler are relatively minor and can be easily made in a short period of time, thereby minimizing cost and downtime.

This invention will now be described by reference to an existing 50,000 pounds per hour steam capacity package D-type boiler retrofitted with the burner of this invention and containing the boiler modifications depicted in FIGS. 1 and 6. The boiler is provided with a burner comprising a cylinder 12 of 10-inch diameter stainless steel pipe 10 feet to 20 feet in length. Refractory pipe or other high temperature resistant conduit can be substituted for the stainless steel pipes. The cylinder 12 is covered with a fire retardant cloth and 4-inch thick block insulation 18.

Air preheated to approximately 400° F. is fed through pipe 16 having a diameter of 6 inches, which is reduced to 5 inches in the turbulent mixing zone 17. The air is mixed with wood shavings from chute 15 to form a fluidized fuel/air mixture, which is passed through conduit 19 to the cylinder 12. Conduit 19 has a 4-inch diameter.

The fuel is burned in the cylinder 20 using air in an amount of about 15 to 20% in excess of stoichiometric air. The residence time of the fuel/air mixture in the cylinder 12 is sufficient to initially heat up the fuel, dry the fuel, pyrolyze volatile materials in the fuel and then initiate combustion. As used herein, the term "combustion" and the term "burn" are employed interchangeably and are intended to signify that a visible flame is present in the fuel/air mixture.

The burning mixture is discharged from cylinder 12 through outlet 14 into fire box 6 where additional (secondary) air is added through nozzles 39. Unburned fuel passes through fire box 7 where additional secondary air is added and the combustion process is completed. The boiler is operated at a flue gas temperature of about 400° F. and 25% excess air. The combustion process in the cylinder 12 is carried out at about 1000° to about 2000° F., depending upon the ultimate analysis and moisture content of the fuel.

This invention is useful for burning hardwood and softwood waste materials generally. The apparatus dimensions and process conditions can be modified to suit the characteristics of the fuel, such as moisture content, ash content, bulk density and particle size. This invention is particularly well suited for burning regular sawdust and planar mill shavings without an intermediate size reduction step. Thus, wood shavings can be generally employed in the size in which they are delivered from the mill.

In determining the process parameters, a package boiler designed to burn natural gas or fuel oil is de-rated by approximately 25% to compensate for the primary air that is needed to burn the wood-waste. For a 50,000 pound per hour steam capacity package boiler, the feed rate of wood-waste shavings to the cylinder 12 is typically about 5500 to about 6000 pounds per hour. The amount of air required to combust these quantities of fuel can be readily calculated, but for the boiler herein described, air preheated to about 400° F. can be fed through pipeline 16 at a flow rate of about 1800 to about 2000 cubic feet per minute at a pressure of about 7 to about 8 inches water column. Under these conditions, the residence time of the fuel/air mixture in cylinder 12 of 10-inch diameter and 10 feet in length is about 0.27 to about 0.30 seconds. The conditions for the pilot fuel are adjusted to maintain a flame in the burner 9 and can be readily determined with a minimum of experimentation. The total air flow in the system is typically about 10,000 cfm, which is generally provided as follows: 1800 to 2000 cfm from pipeline 16, about 2000 cfm from bridge wall nozzles 39, about 2000 cfm from nozzles 41 and the remainder from registers 27 and 28.

It is apparent from the foregoing discussion that an important feature of the present invention is the configuration of the burner, and specifically that the length of the burner is considerably greater than its diameter. The length to diameter ratio of the cylinder 12 in the burner of this invention can be varied depending upon the characteristics of the fuel and the boiler being retrofitted, but the length to diameter ratio should be between about 18:1 to 12:1. In the preferred embodiment of this invention, the length to diameter ratio is about 12:1.

There are a number of advantages associated with the present invention. The wood-waste burner system of this invention can be readily adapted to package boilers that were originally designed for burning natural gas or fuel oil by making only minor modifications to the combustion chamber of the boiler and retrofitting the boiler with the solid fuel burner of this invention. The burner of this invention is of very low cost and can be easily installed in existing boiler facilities. Because there are virtually no moving parts in the burner, maintenance is low. In addition, the burner and wood-waste burner system of this invention are simple to operate and can be easily fitted with conventional instrumentation and safety devices. Most of all, the burner of this invention provides very efficient burning of wood-waste products resulting in considerable economic savings over conventional fossil fuels.

What is claimed is:

1. A waste burner for burning a fuel comprising combustible, solid, divided wood-waste, said burner comprising
   (A) an elongated cylinder having a longitudinal axis, a fuel inlet proximate one end thereof and an outlet at the other end thereof;
   (B) means for supplying air to said burner for combusting said fuel, wherein said air supply means is positioned upstream of said fuel inlet such that the air initially mixes with said fuel in a turbulent mixing zone to form a fuel/air mixture;
   (C) means for igniting said fuel/air mixture in said cylinder comprising a multiplicity of pilot flame nozzles substantially uniformly spaced around the circumference of said cylinder;
   (D) diffuser means in said outlet for directing unburned fuel and combustion products away from said axis as said fuel and products exit said cylinder;
   (E) means for detecting flame in said burning fuel/air mixture;
   (F) conduit means for feeding fuel to said inlet;
   wherein said diffuser means is of conical shape and said diffuser is positioned such that the longitudinal axis of said cone coincides with the longitudinal axis of said cylinder and the apex of said cone is inside said cylinder; and
   wherein said cylinder has a length:diameter ratio between about 18:1 to 12:1 sufficient to partially combust said fuel therein, and wherein the length of the cylinder is equal to the distance between the pilot flame nozzles and the outlet of the cylinder.

2. A burner according to claim 1 wherein each of said nozzles has a longitudinal axis substantially parallel to the longitudinal axis of said cylinder.

3. An apparatus for burning combustible, solid, divided wood-waste products as fuel comprising
   (I) a burner comprising
      (A) an elongated cylinder having a longitudinal axis, a fuel inlet proximate one end thereof and an outlet at the other end thereof;
      (B) means for supplying air to said burner for combusting said fuel, wherein said air supply means is positioned upstream of said fuel inlet such that the air initially mixes with said fuel in a turbulent mixing zone to form a fuel/air mixture;
      (C) means for igniting said fuel/air mixture in said cylinder comprising a multiplicity of pilot flame nozzles substantially uniformly spaced around the circumference of said cylinder;
      (D) diffuser means in said outlet for directing unburned fuel and combustion products away from said axis as said fuel and products exit said cylinder;
      (E) means for detecting flame in said burning fuel/air mixture;

(F) conduit means for feeding fuel to said inlet, said conduit having means for closing said conduit to prevent flame spread through the conduit;

wherein said diffuser means is of conical shape and said diffuser is positioned such that the longitudinal axis of said cylinder and the apex of said cone is inside said cylinder; and wherein said cylinder has a length:diameter ratio between about 18:1 to 12:1 sufficient to partially combust said fuel therein, and wherein the length of the cylinder is equal to the distance between the pilot flame nozzles and the outlet of the cylinder; and (II) a refractory lined combustion chamber defined by side walls;

wherein the outlet of said burner passes through one of said side walls and wherein said chamber is divided to form two fire boxes in communication with each other, whereby unburned fuel from the first fire box can pass into the second fire box and be burned therein, each of said fire boxes including a multiplicity of openings for injecting air into said chamber to aid in combustion of fuel; said apparatus having convection tubes, the outer surfaces of which are in communication with each of said fire boxes such that hot combustion products from said chamber can contact said tubes.

4. An apparatus according to claim 3 wherein said chamber includes a multiplicity of openings for injecting air into said chamber to aid in combustion of unburned fuel exiting said cylinder.

5. An apparatus according to claim 4 wherein said air nozzles are positioned on a wall facing the wall through which said nozzle passes.

6. An apparatus according to claim 3 having convection tubes, the outer surfaces of which are in communication with said chamber such that hot combustion products from said chamber can contact said tubes.

7. An apparatus according to claim 3 having means for feeding air into said chamber, said air feeding means comprising at least one air register in the wall through which said burner passes and proximate said burner outlet.

* * * * *